Figure 1:
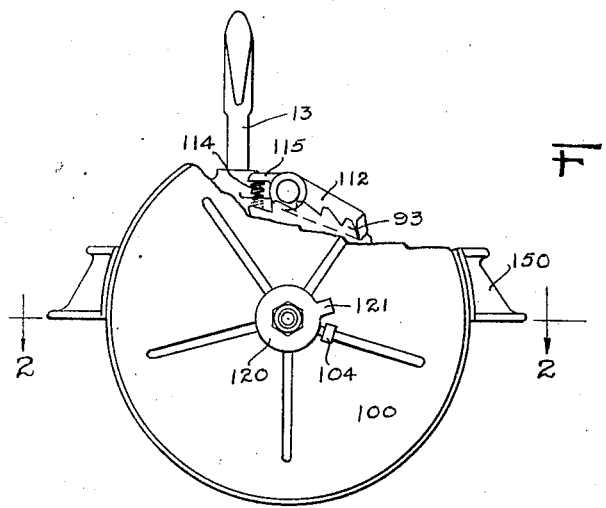

Sept. 24, 1929.     A. H. CHAPPELKA     1,729,262
HOIST
Filed May 27, 1927     2 Sheets-Sheet 1

Inventor
Arthur H. Chappelka
By Bates, Macklin, Golrick & Teare
Attorney

Sept. 24, 1929.  A. H. CHAPPELKA  1,729,262
HOIST
Filed May 27, 1927   2 Sheets-Sheet 2
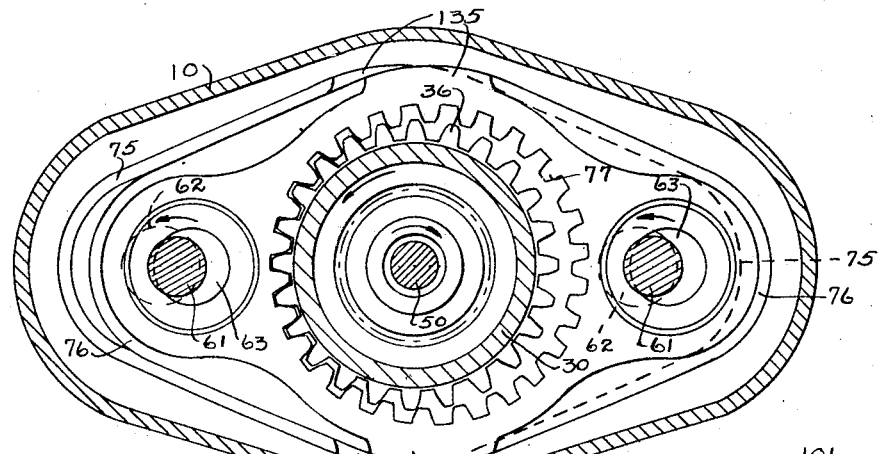
FIG.-3
FIG.-4
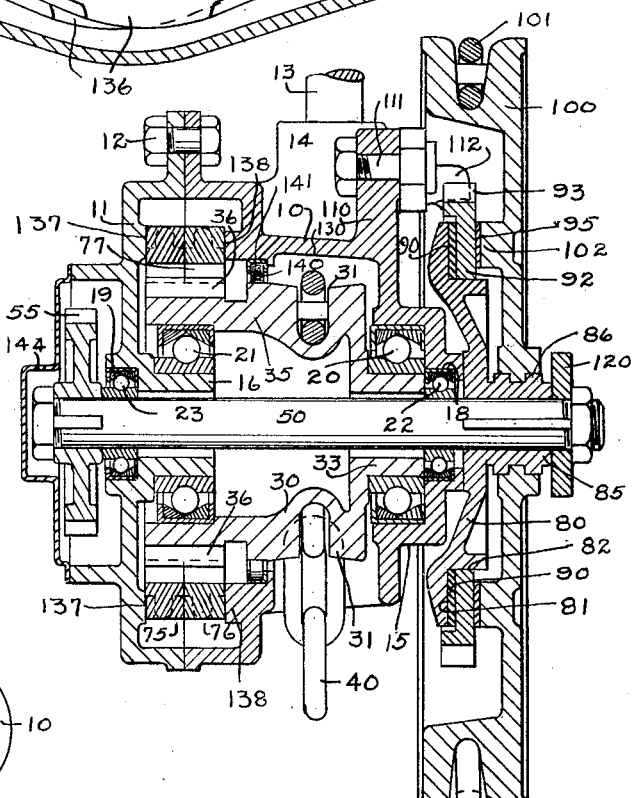
FIG.-5
Inventor
Arthur H. Chappelka
By Bates, Macklin, Golrick & Tears
Attorney Patented Sept. 24, 1929

1,729,262

UNITED STATES PATENT OFFICE

ARTHUR H. CHAPPELKA, OF WILLOUGHBY, OHIO, ASSIGNOR, BY MESNE ASSIGNMENTS, TO CHISHOLM-MOORE HOIST CORPORATION, OF BUFFALO, NEW YORK, A CORPORATION OF NEW YORK

HOIST

Application filed May 27, 1927. Serial No. 194,653.

This invention relates to a hoist of the type shown in Patent No. 946,253 granted to E. Y. Moore, and manufactured and marketed by The Chisholm-Moore Manufacturing Company under the name of "Cyclone hoist". In such type of hoist there is a pair of yokes with internal teeth surrounding a gear on the lift wheel, and a pair of rotatable eccentrics, geared with the drive shaft and rotated thereby, give gyrations or circular translations to such yokes to turn the lift wheel relatively slowly. It is the primary object of my invention to reduce the internal friction of such hoist mechanism and thereby increase its efficiency and durability. I accomplish this result by so designing the hoist that I mount all rotating parts on rolling bearings, preferably ball bearings. The means by which this is accomplished is shown in the drawings hereinafter more fully described.

Another object is to so arrange the lift wheel and its bearings that a light and compact construction may be obtained without sacrificing strength. Other features of the invention will be apparent from the following detailed description.

Figure 2:
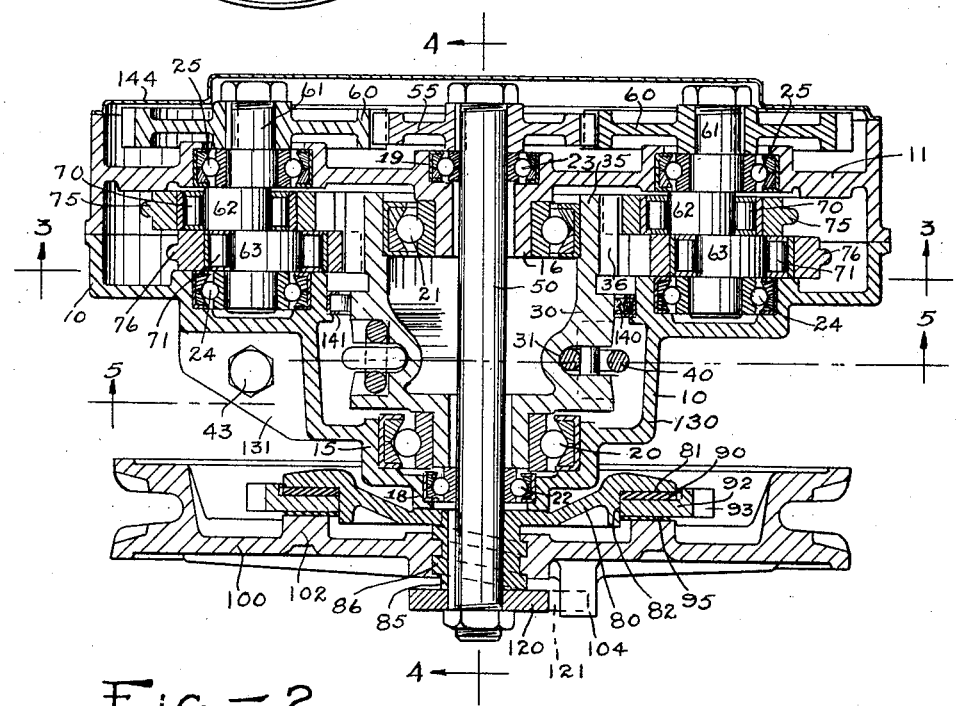

In the drawings, Fig. 1 is an elevation of my hoist partly broken away; Fig. 2 is a horizontal cross-section, as indicated by the line 2—2 on Fig. 1 but on a larger scale; Fig. 3 is a vertical section in the plane indicated by the line 3—3 on Fig. 2; Fig. 4 is a vertical section along the axis of the drive shaft, as indicated by the line 4—4 on Fig. 2; Fig. 5 is a detail on a smaller scale, illustrating the anchorage for the lift chain, this being a vertical section on the line 5—5 on Fig. 2.

As shown in the drawings, the frame of the hoist consists of two members 10 and 11 bolted together, as at 12, to make a hollow nearly closed casing. A supporting hook designated at 13 is shown as mounted in a suitable boss 14 carried by the frame member 10, though the hoist structure may be carried in other means, if desired.

The frame member 10 is offset toward the front as shown in Fig. 2 and is there formed centrally into a cup portion 15 in which is mounted a ball bearing 20. The partition portion of the frame member 11 is provided with an inwardly extending tubular portion 16, on the exterior of which is mounted a ball bearing 21. The lift wheel, designated 30, (which may have the usual pockets 31 to receive the lift chain 40) is provided in one end with a tubular extension 33 which stands in the region surrounded by the ball bearing 20 and carries the inner race thereof. The other end of the lift wheel is extended, as at 35, and bears internally on the ball bearing 21. The ball bearings 20 and 21 may be duplicates, but the outer race of the ball bearing 20 is carried by the frame member within the cup 15 and the inner race of the ball bearing 21 is carried on the exterior on the tubular frame extension 16.

It will be seen that by the construction described, the lift wheel is mounted on a pair of ball bearings, which are carried by the frame and that the arrangement is such as to leave an unobstructed passageway through the lift wheel about its axis. This passageway is occupied by the drive shaft as will now be explained.

The cup 15 of the frame member 10 is formed with a smaller cup 18 around the axis. The frame member 11 is formed on its outer side with an external recess or cup 19 of similar size. In these two small recesses are mounted ball bearings 22 and 23, each bearing having its outer race resting in the frame recess. The driving shaft 50 extends through the hoist and is mounted in the two bearings 22 and 23, the inner races of these bearings being keyed on the shaft. The lift wheel being mounted on its own bearings carried by the frame, is entirely out of contact with the drive shaft.

Keyed on the rear end of the drive shaft 50 is a spur gear 55 which meshes with two spur gears 60. Each spur gear 60 is keyed on a shaft 61 which carries a pair of eccentrics 62 and 63. The inner ends of the shafts 61 are mounted in ball bearings 24 carried in recesses in the frame member 10, while between the eccentrics 62 and the gears 60 they are mounted in ball bearings 25 carried in recesses in the frame member 11. Each eccentric 62 is embraced by a roller bearing 70, which occupies a cylindrical recess in a yoke 75. Similarly each eccentric 63 is embraced by a roller bearing 71 which occupies a cylindrical recess in a yoke 76. The yokes 75 and 76 are provided with internal gear teeth 77 which surround and engage external gear teeth 36 formed on the exterior of the lift wheel extension 35, the number of internal teeth 77 exceeding somewhat the number of teeth of the external gear 36.

It results from the construction described, that when the shaft 50 is rotated, the two pairs of eccentrics are rotated in unison, thus the two yokes are given circular translations, meshing successively with fresh teeth of the lift wheel to give it a comparatively slow rotation. Each gyration of the yokes gives the external gear on the lift wheel such portion of a rotation as the difference between the number of teeth on the external gear and on the yoke bears to the number of teeth on the external gear. It will be noticed that while the two eccentrics 62 extend both in the same direction (toward the left in Fig. 2) and the two eccentrics 63 extend both in the same direction, the direction of this latter pair is opposite that of the former pair. Thus the yokes act oppositely on the lift wheel, one yoke shoving downwardly on one side while the other yoke is shoving upwardly on the other side. This opposite action equalizes the stress, as set out in the patent to E. Y. Moore referred to. In my hoist, however, the friction of the eccentric shafts in their bearings is greatly reduced by reason of the ball bearings mounted in the cups in the frame members as described.

Any suitable means may be employed to rotate the drive shaft 50. I have shown however, a hand wheel controlling an improved automatic brake, operating in general similarly to the mechanism shown in E. Y. Moore's patent mentioned. This will now be described.

Keyed on the exterior portion of the drive shaft 50 is a wheel 80 having a smooth annular friction surface 81 and a cylindrical seat 82. Surrounding the seat 82 and resting against the smooth surface 81 is an annular ring 90, preferably of fiber or similar material. On the outer side of this ring, mounted on the seat 82, is a metal ring 92 having on its periphery ratchet teeth 93. On the outer side of the ratchet ring is preferably a steel rub ring 95. The hub 85 of the wheel 80 has on its exterior a thread 86 of one or two turns and mounted on this thread is the driving wheel, shown as a hand chain wheel 100 carrying the chain 101. This hand chain wheel is provided on its inner surface with an annular boss 102 registering with the rub ring 95.

Now when power is applied to the driving wheel 100 in the direction to raise the load, such wheel first turns relative to the wheel 80, and thus by reason of the threaded connection moves itself inwardly to clamp the ratchet ring 92 between the clamping wheel 80 and the driving wheel; then all these parts rotate as a unit and the main shaft 50 is thus given a rotation for each rotation of the driving wheel, and this, as already described, gives a fraction of a rotation to the lift wheel.

The frame member 10 is provided with an upwardly extending standard 110, Fig. 4, on which is mounted a stud 111 carrying a pawl 112 adapted to engage the ratchet teeth 93. The pawl nose is shown as constantly pressed toward the teeth by a spring 114 (Fig. 1) compressed between the frame and a tail 115 of the pawl. Accordingly as the hand chain wheel rotates, the ratchet teeth click idly under the pawl, but as soon as the driving rotation stops, the pawl prevents backward rotation of any of the parts and thus sustains the load. Thus whenever the raising pull on the hand chain ceases, the load remains sustained at that point.

If it be desired to lower the load, a downward pull on the hand chain on the other side of the wheel 100 screws this wheel by reason of the thread 86 away from the clamping wheel 80 sufficiently to loosen the grip on the ratchet ring 92, and thus, though the pawl retains that ring, the clamping wheel and hand wheel slip on it and the load moves down. This descent of the load will continue so long as the pull on the hand chain keeps ahead of the load. Whenever the downward pull ceases, the turning of the lift wheel by reason of the pull of the load rotates the thread 86 within the hand chain wheel to cause the latter to clamp the clamping wheel and thus the load is again held.

To provide for positive rotation of the lift wheel in the backward direction in case of no load on the lift wheel (or such a light load as is not sufficient to pull down the chain), I mount on the end of the shaft 50 a collar 120 having a projecting lug 121 (Fig. 1). This lug is adapted to engage a lug 104, on the hand wheel. Normally the lugs 121 and 104 do not coact and their operation is idle, but in case, for instance, that the lift chain becomes entirely wound up without a load, it is desirable to rotate it backwards to free the load hook from the pocket wheel, and this is effected by giving a backward turn on the hand chain wheel until the lugs do engage, and the hand chain wheel then drives the shaft positively in the downward direction and thus effects the result. However, when there is a substantial load on the lift hook, the weight of the load furnishes sufficient pull on the lift wheel so that the clamping wheel 80 will catch up with the hand wheel in lowering, sufficiently so that these lugs will not come into engagement at all.

I have referred to the frame as making a nearly closed hollow casing. The portion of the frame member 10 which extends above the lift wheel is preferably an arch open at the bottom, as shown at 130 in Fig. 5. This makes a very satisfactory guard for the lift wheel while leaving the chain free to depend with each side thereof. The idle end of the chain may be readily supported by an anchorage 43 secured to a gusset plate 131 formed between the hood portion 130 of the frame member 10 and the main portion thereof.

To allow the yokes 75 and 76 to move easily and at the same time prevent their becoming tipped in one direction or the other, throwing an uneven wear on the gear teeth, I provide rubbing surfaces 135 and 136 Fig. 3, on the yokes adjacent their highest and lowest points on opposite sides, and these constantly engage with bosses 137 and 138 formed in corresponding regions on the inner faces of the frame plates which are on opposite sides of these yokes. Thus, there is little friction between the yokes and the frame and at the same time the yokes are prevented from displacement.

The portion of the hollow casing occupied by the yokes and external gear 36 is made into a separate closed chamber by reason of a felt dust ring 140 carried in a suitable rim 141 resting against a cylindrical wall of the portion of the casing member 10 and bearing against a smooth cylindrical portion of the lift wheel. The spur gears 55 and 60 are enclosed in a chamber made by a wall of the frame member 11 and a suitable dust cap 144. Thus the yokes and the gears, if desired, may be packed in grease or maintained in oil.

A suitable guard may, if desired, be employed for the hand chain. Such guard is shown at 150 in Fig. 1 and is suitably secured to the frame member 10, either above the cup-like portion 15 or embracing it.

It will be seen from the description heretofore given, that the ball bearing 21 which acts on the inside of the lift wheel extension is located directly in line with the yokes and thus receives the thrust of these yokes as they shove on the lift wheel in raising the load. On the other hand, the location of the bearing 20 for the other side of the lift wheel on the exterior brings that bearing close to the load chain, and enables the formation of the peculiarly shaped load wheel as shown, wherein immediately adjacent the pocket portion there is the disk-like inwardly extending web. This makes an excellent support for the load reducing the bending moment in the surface of the lift wheel. Thus the lift wheel may be made lighter than if both bearings were internal. Moreover, by arranging the external bearing on the hand wheel side of the lift wheel, greater compactness is obtained and more space is available for the location of the clamping wheel, which as shown extends inwardly beyond the contour of the frame cup 15 carrying the bearing. The arrangement shown also enables ready assemblage of the hoist. Before the frame members are bolted together, the bearing 22 is put in place in recess 18 and then the bearing 20 in the recess 15, and the bearings 24 are put in their recesses. Similarly the bearings 19, 21 and 25 are mounted on the frame member 11. Then, when the lift wheel, eccentric shafts and yokes are put in place, these frame members are bolted together, and all of the bearings are retained in true position, as described.

I claim:

1. In a hoist, the combination of a frame, a hollow lift wheel within the frame, a bearing between the interior of the lift wheel and the frame adjacent one side of the lift wheel and a bearing between the exterior of a tubular extension on the lift wheel and the frame adjacent the other side of the lift wheel, a drive shaft extending freely through the lift wheel and having bearings on each side thereof in the same frame, and connecting mechanism between the drive shaft and the lift wheel.

2. In a hoist, the combination of a hollow frame, a lift wheel within the same, a depending raising member thereon, a rolling bearing on one side of said raising member between the exterior of the lift wheel and one wall of the frame, a rolling bearing on the other side of said raising member between the interior of the lift wheel and the other side of the frame, a drive shaft extending freely through the lift wheel, and mechanism operated by the drive shaft for rotating the lift wheel.

3. In a hoist, the combination of a frame having a pair of spaced plate-like supporting members, one of said members being provided with an internal tubular projection and the other member with an internal recess, a ball bearing on the exterior of said projection, a second ball bearing in the interior of said recess, a lift wheel having an extension at one side of its load-supporting portion, which extension is mounted on the exterior of the first named bearing, said lift wheel having on its other side an inwardly extending web, from the inner edge of which extends a tubular axle of less external diameter than the lift wheel, said axle being mounted on the interior of the second bearing.

4. In a hoist, the combination of a hollow frame, a lift wheel therein, said frame having an inward tubular projection extending within the lift wheel, a rolling bearing having one race resting on said projection and the other race within the lift wheel, a drive shaft extending freely through the lift wheel and having bearings independent of said projection, and connecting mechanism between the drive shaft and the lift wheel.

5. In a hoist, the combination of a hollow frame, an interior projection on one wall of the frame, the opposite wall of the frame having an interior recess, a rolling bearing on the exterior of said projection, a rolling bearing mounted in the interior of said recess, a lift wheel having chain-engaging pockets located in an intermediate region and having an extending portion mounted on the exterior of the first roller bearing, said lift wheel on the other side extending inwardly for a distance and then having a tubular axle which is mounted in the interior of the second bearing, a drive shaft extending freely through the frame and lift wheel and journalled in rolling bearings and mechanism connecting the drive shaft and lift wheel.

6. In a hoist, the combination of a hollow frame, an interior projection on one wall of the frame, the frame having an interior recess in its opposite wall, a rolling bearing on the exterior of said projection, a rolling bearing mounted in the interior of said recess, a lift wheel having an extending portion mounted on the exterior of the first roller bearing, said lift wheel in the other side extending inwardly for a distance and then having a tubular axle which is mounted on the interior of the second bearing, a drive shaft extending freely through the frame and lift wheel, a pair of yokes side by side and having internal teeth engaging external teeth on the lift wheel, two pair of eccentrics for gyrating said yokes, each pair of eccentrics being mounted on a shaft which is journalled in bearings in the opposite frame members, and gearing between the drive shaft and the eccentric shafts.

7. In a hoist, the combination of a lift wheel having external spur gear teeth rigid with it, a pair of yokes having internal teeth engaging such spur teeth, frame members extending on opposite sides of the pair of yokes, the yokes having their side surfaces at opposite ends of the vertical line defining the mid region of the yoke forming two rubbing surfaces of restricted area which engage said frame members, and means for giving said yokes circular translations.

8. In a hoist, the combination of a lift wheel, having external spur teeth rigid with it, a pair of yokes having internal teeth, said yokes lying side by side in engagement with each other and extending about the external teeth, two pairs of eccentrics for gyrating said yokes, and a frame having a chamber housing the yokes and eccentrics, the walls of said chamber having isolated bosses which engage rubbing surfaces on the sides of the yokes directly above and below the lift wheel gear.

9. In a hoist, the combination of a frame having two spacially arranged side members, one provided on its inner side with a recess and the other on its inner side with a tubular projection coaxial with said recess, a hollow lift wheel between the frame members having a tubular extension in one direction extending over and taking its bearing on said tubular projection and having a tubular extension in the other direction extending into and having its bearing on the wall of said recess, a shaft having its own bearings and mounted coaxially of said frame projection and recess, a pair of yokes having internal teeth coacting with spur teeth on the first mentioned extension of the lift wheel substantially in the vertical plane of said frame projection, and mechanism operated by said shaft for giving said yokes circular translations to gradually rotate the lift wheel.

10. In a hoist, the combination with a frame, of a lift wheel having a hollow extended portion provided with external spur gear teeth thereon, a pair of yokes having internal teeth engaging, such spur teeth mechanism for giving said yokes circular translations to gradually rotate the lift wheel, a projection on the frame extending within said hollow extension, and a rolling bearing between the interior of the lift wheel extension and the inward projection on the frame, which bearing is in line with the yokes to receive the thrust thereof directly.

11. In a hoist, the combination of a frame, a hollow lift wheel within the frame having tubular extensions on its opposite sides, one of said extensions being of larger diameter than the other, a bearing between the interior of the larger tubular extension and the frame adjacent one side of the lift wheel and a bearing between the exterior of the smaller tubular extension and the frame adjacent the other side of the lift wheel, a drive shaft extending freely through the lift wheel and having bearings on each side thereof in the same frame, and connecting mechanism between the drive shaft and the lift wheel.

In testimony whereof, I hereunto affix my signature.

ARTHUR H. CHAPPELKA.